May 31, 1966 T. D. KEGELMAN 3,254,156
TRANSVERSE CORRELATION SYSTEM
Filed Oct. 9, 1962 2 Sheets-Sheet 1
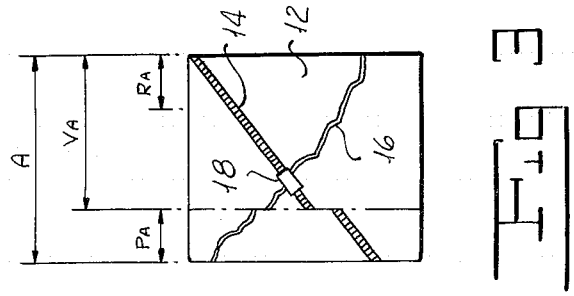
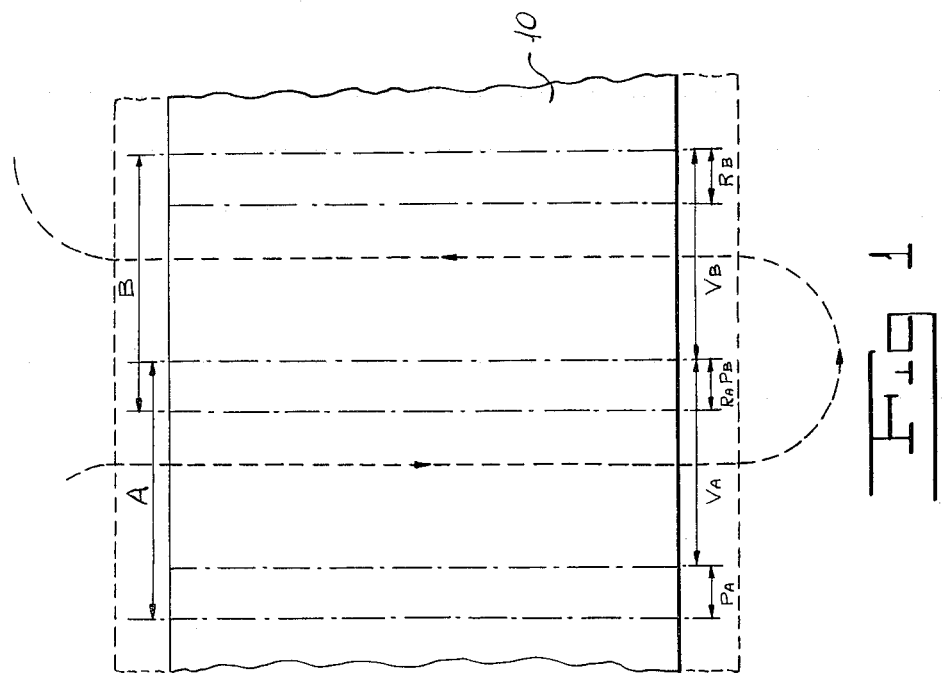
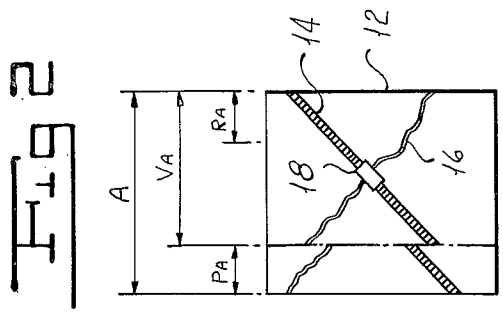
INVENTOR.
THOMAS D. KEGELMAN
BY
Shenier & O'Connor
ATTORNEYS

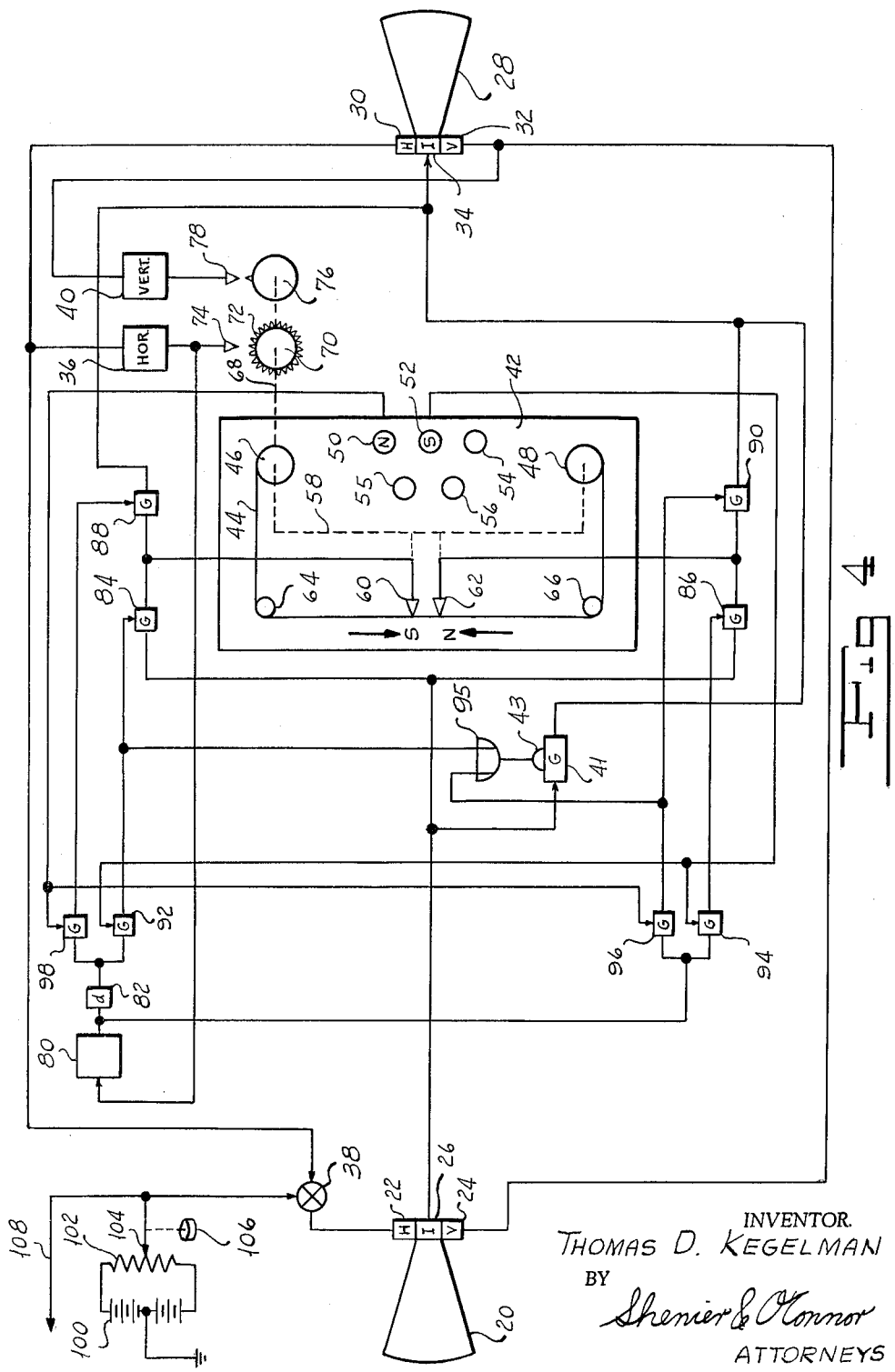

United States Patent Office 3,254,156
Patented May 31, 1966

3,254,156
TRANSVERSE CORRELATION SYSTEM
Thomas D. Kegelman, West Nyack, N.Y., assignor to United Aircraft Corporation, East Hartford, Conn., a corporation of Delaware
Filed Oct. 9, 1962, Ser. No. 229,403
7 Claims. (Cl. 178—6)

My invention relates to a transverse correlation system and more particularly to a system for ensuring, during an aerial photography mission, a precise overlap of photographs in a direction transverse or normal to the flight path on successive legs of the flight.

In the art of aerial photographs for mapping, the aircraft carrying a camera usually is flown over the terrain to be photographed in a number of adjacent parallel legs. Periodically as the craft follows its flight path on each leg the camera is operated so that at the end of the operation the camera has taken a series of photographs covering the entire area to be mapped.

In order that the photographs taken during the flight can be correctly correlated to produce a composite picture of the area over which the craft is flown, it is necessary that some overlap of adjacent photographs be provided both in the direction of the flight path and in a direction transverse to the flight path. In the prior art, systems are known for providing the desired overlap in the direction of the flight path. For example a controlled phase shift timing source generates a sequence of timing pulses which are displayed together with a moving television image of the area being photographed. A manually-operable timing pulse velocity control can be adjusted to lock in terrain and timing pulses to ensure that the proper overlap in the direction of the line of flight is provided.

As is pointed out hereinabove, it is necessary that there be an overlap not only in the direction of the line of flight but also in a direction transverse to the line of flight so that photographs taken on adjacent legs or runs can properly be matched. In the prior art this is accomplished in a hit-or-miss manner with the pilot relying on his memory and skill to ensure that a portion of the strip over which he is presently flying overlaps a portion of the strip over which he has just flown. This method has all the defects of any method which depends for its accuracy on the recollection and skill of an individual operator.

I have invented a transverse correlation system which ensures a precise amount of overlap of aerial photographs in a direction transverse to the line of flight. My system presents the pilot with information which permits him to observe the registry of an area over which he has just flown with the area which he is presently flying. My system provides an electrical signal which indicates any deviation from the line of flight which should be flown in order to ensure an accurate percentage overlap in the transverse direction. I may employ my system to provide an automatic control for ensuring that the craft flies over the desired line of flight.

One object of my invention is to provide a transverse correlation system which ensures a precise amount of overlap of aerial photographs in a direction transverse to the line of flight.

Another object of my invention is to provide a transverse correlation system which presents the pilot with information permitting him to maintain the required course to give the desired amount of overlap.

A further object of many invention is to provide a transverse correlation system for producing a signal indicating any deviation from the flight path which is necessary to produce the required overlap.

Other and further objects of my invention will appear from the following description.

In general my invention contemplates the provision of a transverse correlation system in which I record information corresponding to a strip of the area being photographed during one flight leg of a photographic mission. The recorded strip is adjacent the area to be photographed during the next flight leg and is equal in width to the desired amount of overlap. On the succeeding flight leg the recorded information is displayed alongside the new area to permit the pilot visually to observe any misalignment of the recorded strip with the new information. By operating a control the alignment of the recorded image with the new image can be maintained to produce an electrical control signal proportional to the deviation of the line of flight from that which is required to produce the desired overlap.

In the accompanying drawings which form part of the instant specification and which are to be read in conjunction therewith and in which like reference numerals are used to indicate like parts in the various views:

FIGURE 1 is a diagrammatic view illustrating two adjacent areas being photographed on successive legs of a flight.

FIGURE 2 is a diagrammatic view of the information presented to the pilot when his line of flight is such that a redundancy of information is being photographed.

FIGURE 3 is a diagrammatic view of the information presented to the pilot when his line of flight is such that information is being skipped.

FIGURE 4 is a schematic view of one form of my transverse correlation system.

Referring now to FIGURE 1 of the drawings, I have shown a portion of the terrain 10 which is to be photographed as being diivded into two areas, A and B, which are to be photographed on successive legs of a flight. It will be assumed that in photographing the terrain 10 the pilot follows the line of flight indicated by broken lines in FIGURE 1 until he flies in a southerly direction over the area A, then makes a 180° turn and flies over the area B in a northerly direction. He continues this flight pattern until all the terrain has been photographed.

In my system assuming that the pilot is flying in a southerly direction over the area A, he is continuously presented with a picture of the area. As he flies this leg a strip $R_A$ at the left of his direction of flight is continuously recorded. When he completes this leg of his flight he makes a turn of 180° and begins the northerly leg of flight over the area B. As he flies over the area B he is presented with a live picture of the portion $V_B$ of the area and at the same time a strip $R_B$ at the right of the direction of flight is being recorded for playback on the next southerly leg. It is to be noted that during the southerly leg over the area A the pilot was presented with a live image of the portion $V_A$ of the area together with a playback $P_A$ of a portion recorded on the previously flown northerly leg.

Referring now to FIGURES 2 and 3 I have shown the picture presented to the pilot as he flies over the area A for two different conditions of deviation of his actual line of flight from that which corresponds to the desired amount of overlap. By way of illustration, there is shown a picture 12 in which a railway 14, for example, passes over a stream 16 by means of a bridge 18. If the pilot is to the left of the required line of flight then the live image of the portion $V_A$ contains a redundancy of the information in the playback portion $P_A$ image. In order to correct this condition it is necessary that the pilot steer right until a continuous picture 12 is presented thus indicating that the correct line of flight is being flown.

If during the course of his flight over the area A the pilot is presented with a picture such as is shown in FIGURE 3 in which some information is being skipped, then he must steer left until he is presented with a continuous image thus to correct this condition. It will be apparent that with the information presented on the screen, the pilot can continuously cause the live image $V_A$ to form a continuous picture with the recorded image $P_A$ thus to ensure that the correct line of flight giving the desired amount of overlap is being flown.

Referring now to FIGURE 4 of the drawings I have shown a schematic view of one circuit which can be used to implement my transverse correlation system, the operation of which is described hereinabove. A suitable television imaging sensor such, for example, as a vidicon 20 having a horizontal sweep input terminal 22, a vertical sweep input terminal 24 and an information output terminal 26 is used to scan the area over which the craft is flying. The display may be presented on a suitable display tube 28 having a horizontal sweep input terminal 30, a vertical sweep input terminal 32 and an information input terminal 34. A horizontal sweep signal channel 36 actuated in a manner to be described hereinafter provides the horizontal sweep signal for the vidicon 20 through a summer 38 and directly to terminal 30 of tube 28. A vertical sweep signal generator 40 provides the vertical sweep signal for the vidicon 20 and for the display tube 28. The information output 26 of the vidicon 20 is coupled to the input information terminal 34 of tube 28 through a normally conductive gating circuit 41 adapted to be inhibited in response to a signal at a terminal 43.

My system includes a tape drive mechanism 42 adapted to drive a tape 44 in a direction to move off a reel 46 and onto a reel 48 in one flight direction and adapted to drive tape 44 in the other direction for the reverse flight direction. For example, in response to actuation of a push button 50 the tape 44 is driven in a direction corresponding to a northerly flight leg. Actuation of a push button 52 will drive the tape in a direction corresponding to a southerly flight leg while operation of a button 54 will stop the tape drive. I provide respective buttons 55 and 56 for respectively stepping the tape forward or retarding the tape to align the playback image with the live image in a longitudinal direction before the actual flight leg begins. As is indicated schematically by the broken line 58, I mechanically couple the tape drive to respective recording and playback heads 60 and 62 of the rotary type. Guide rollers 64 and 66 guide the tape 44 for movement past the heads 60 and 62. As is known in the art, each of the heads 60 and 62 is of the type which first erases and then records information on the tape when a signal is fed to the head and which takes information from the tape when no signal is applied to the head.

The shaft 68 of reel 46, for example, carries a disc 70 provided with a plurality of teeth 72 adapted to actuate a sensor 74 for producing a plurality of output pulses which trigger the horizontal sweep generator 36. Disc 70 has a number of teeth corresponding to the number of lines making up a field of view. Shaft 68 carries a second disc 76 which actuates a sensor 78 once for each revolution of shaft 68 to actuate the vertical sweep circuit 40.

From the discussion hereinabove of FIGURES 1 to 3, it will readily be apparent that during a portion of each line of a field of view the display tube 28 must be blanked to permit the previously recorded information to be displayed over this portion of the line. I apply the pulses from the sensor 74 to a monostable multivibrator circuit 80 so that each output pulse of the sensor 74 causes the circuit 80 to produce a blanking pulse. As will also be apparent from the description advanced hereinabove for a northerly direction of flight, the beginning of each line must be blanked while for the other direction of flight the end of each line must be blanked. The output of circuit 80 is used in a manner to be described to blank the beginning of each line for the northerly direction of flight during which time the previously recorded information is to be played back.

I apply the output of the circuit 80 to a delay circuit 82 which delays the multivibrator output for a period of time such that the delay circuit produces an output pulse at the terminal portion of each line. This delay circuit output pluse is used to blank the terminal portion of the live image during a southerly leg to permit previously recorded information to be displayed during this time.

I couple the output information terminal 26 of the vidicon 20 to respective gating circuits 84 and 86 which are normally non-conductive and which when rendered conductive pass the information signal to the respective heads 60 and 62 to cause them to record the information on the tape 44. Respective normally non-conductive gating circuits 88 and 90 are adapted to be rendered conductive to pass the output from the heads 60 and 62 to the information input terminal 34 to the display tube 28.

As will be apparent from the description given hereinafter, only one of the gates 84 and 88 is conductive at any one time so that the associated head 60 functions either as a recording head or as a playback head. Similarly only one of the gating circuits 86 or 90 is conductive at a given time so that the associated head 62 functions as a recorder or as a playback head. When the head 60 is operating to record information then head 62 is a playback head and when head 62 is recording information head 60 is the playback head.

Considering first a southerly flight leg, I apply the delayed blank pulse from circuit 82 to a gating circuit 92 which is rendered conductive in response to the signal indicating a southerly leg. When this condition exists the blanking pulse passes through the gating circuit 92 to a two-input OR circuit 95 the output of which is applied to the inhibiting input terminal 43 to render circuit 41 nonconductive to prevent the information from the terminal 26 of vidicon 20 from passing to the input terminal 34 of display tube 28.

I apply the output of the gating circuit 92 to the gating circuit 88 to render this circuit conductive to pass the output of head 60 to the input terminal 34 of display tube 28. That is, in this direction of flight the head 60 functions as a playback head. It will thus be apparent that for this heading the tape 44 is driven in the direction of the arrow S to move the tape from the drum 46 onto the drum 48.

The output of the multivibrator 80 which occurs in time before the output of the delay circiut 82 is applied to a gating circuit 94 which is rendered conductive during a southerly leg to pass the signal to the control terminal of gating circuit 86 to render this circuit conductive to pass the output information from terminal 26 of vidicon 20 to the head 62 which after erasing the previously recorded information records information corresponding to the strip $R_A$ on the tape as it moves onto the drum 48.

Considering now a northerly leg, I actuate push button 50 to cause the tape to move in the direction of the arrow N past the heads 62 and 60 in succession. A gating circuit 96 rendered conductive by the northerly flight signal passes the output of multivibrator 80 to the OR circuit 95 to inhibit circuit 41 to blank the initial portion of the display. At the same time gating circuit 96 passes the pulse from circuit 80 to the gating circuit 90 to render this circuit conductive to permit head 62 which now functions as a playback head to pass information to the display input terminal 34 of tube 28.

A gating circuit 98 which is rendered conductive by the northerly flight signal passes the delayed output pulse of the control terminal of circuit 84 to head 88 to cause the information from the vidicon 20 to be applied to the head 60 during the terminal portion of the display so that this portion of the display is recorded on the tape 44 after the previously recorded information has been erased.

It will be apparent from the description thus far that, by visual observation of the picture presented to him, the pilot can determine whether he should steer right or steer left to make the picture of the recorded information register with the live picture. I provide my system with a means for permitting the operator to continuously cause the pictures to register to generate a signal which can be fed to an automatic pilot, for example, to cause the craft to follow the desired line of flight. I connect a battery 100 having a grounded center tap in series with a resistor 102 adapted to be engaged by a brush 104. A manually-operable control 106 is adapted to move the brush 104 along the resistor 102 to pick off a voltage which is fed to the horizontal sweep by the adder 38 to bring the recorded picture and the live picture into registry. The same signal can be fed by a channel 108 to a suitable control device for bringing the craft to the desired line of flight.

In operation of my transverse correlation system I will assume that the craft is entering the area A on a southerly heading but that it has not yet reached the area. I will assume also that I have recorded the strip $P_A$ during the preceding northerly flight leg. As the pilot approaches the area he actuates the S button 52 of the tape drive 42 to start the tape 44 moving in the direction of the area S in FIGURE 4. At the same time signals are applied to the control input terminals of the gates 92 and 94 to render these circuits conductive. As shaft 68 rotates, the sensor 74 produces a number of pulses to actuate the horizontal sweep circuit 36 a number of times for each revolution corresponding to the number of lines per frame. On each pulse the multivibrator 80 produces a pulse which is delayed by the circuit 82 and then applied to circuits 92 and 98. The pulse from circuit 80 passes through the now conductive circuit 94 to open gating circuit 86 to cause the output information from the vidicon to pass to head 62 which records the information representing strip $R_A$ according to information corresponding to $R_A$ on tape 44. The delayed pulse from circuit 82 passes through the now open gating circuit 92 to the OR circuit 95 to inhibit circuit 41 during the terminal portion of the display to blank the tube 28 over this portion. The delayed pulse passing through gating circuit 92 renders gating circuit 88 conductive to cause the head 60 to play back the recorded information representing the strip $P_A$ and display this information on tube 28 over the terminal portion of the display. That is, as the craft flies in a southerly direction over the area A during the initial portion of each horizontal sweep, head 62 records information. At the same time, during the initial and central portions of the sweep, information is displayed live on tube 28. During the terminal portion of each sweep the tube is blanked and the previously recorded information is displayed.

It will be seen that, before he actually enters the area A, the pilot is presented with a picture from which he can determine first whether or not the live presentation leads or lags the recorded display. Before he enters the area he actuates button 55 or button 56 to cause the recorded display and the live display to register in a longitudinal direction. After he has entered the area he can continuously actuate the knob 106 to cause the live and recorded displays to register to produce a signal which can be fed to the automatic control device to ensure that the craft is flying over the correct line of flight.

After the area A has been scanned, the pilot goes a short distance further with the equipment operating and then actuates the stop button 54 to stop the tape. Having made his turn toward the area B and before he enters the area, he operates button 50 to start the tape in the direction of the area N and to apply a signal to the control terminal of each of the circuits 96 and 98. Before he enters the area he has sufficient information to permit him to align the recorded and live pictures longitudinally. The gate 96 conducts the pulse from circuit 80 to the OR circuit 95 to inhibit circuit 41 to prevent the information from vidicon 20 from being applied to the display tube 28. At the same time this pulse opens the normally non-conductive circuit 90 to cause head 62 to play back recorded information to the display tube 28. The delayed pulse from circuit 82 passes through the gating circuit 98 to open the normally non-conductive gating circuit 84 to cause the information from the vidicon 20 to be applied to the head 60 during the terminal portion of the display to record the information representing strip $R_B$. Now during his flight over the area B knob 106 is actuated to maintain the aircraft on that line of sight which corresponds to the desired overlap.

It will be seen that I have accomplished the objects of my invention. I have provided a transverse correlation system which ensures a precise amount of overlap of aerial photographs in a direction transverse to the line of flight. My system presents the pilot with information which enables him to maintain the required line of flight with a high degree of accuracy. My system is adapted to generate a signal which can automatically control the aircraft to cause it to follow the predetermined line of flight.

It will be understood that certain features and subcombinations are of utility and may be employed without reference to other features and subcombinations. This is contemplated by and is within the scope of my claims. It is further obvious that various changes may be made in details within the scope of my claims without departing from the spirit of my invention. It is, therefore, to be understood that my invention is not to be limited to the specific details shown and described.

Having thus described my invention, what I claim is:

1. A transverse correlation system for enabling flight along a desired line over a second area following flight along a line over a first area, said desired line being parallel to said first area, said first area being adjacent said second area in a direction transverse to said desired line of flight including in combination means for recording a portion of said first area contiguous to said second area during flight over said first area, means for producing a representation of said second area during flight thereover, and means for comparing said representation with said recorded portion to produce an indication of a transverse deviation of the line of flight over said second area from said desired line.

2. A transverse correlation system for facilitating flight along a desired line over a second area following flight along a line over a first area, said desired line being parallel to said first area line, said first area being adjacent said second area in a direction transverse to said desired line of flight including in combination means for recording a portion of said first area contiguous to said second area during flight over said first area, means for displaying said second area during flight thereover, and means for displaying said recorded portion adjacent said second area display to indicate a transverse deviation of the line of flight over said second area from said desired line.

3. A transverse correlation system for facilitating flight along a desired line over a second area following flight along a line over a first area, said desired line being parallel to said first area line, said area being adjacent said second area in a direction transverse to said desired line of flight including in combination means for recording a portion of said first area contiguous to said second area during flight over said first area, means for producing a representation of said second area during flight thereover, and means responsive to said representation and to said recorded portion for producing a command signal representing the transverse deviation of the line of flight over said second area from said desired line.

4. A transverse correlation system for facilitating flight along a desired line over a second area following flight along a line over a first area, said desired line being parallel to said first area line, said first area being adjacent said second area in a direction transverse to said desired line of flight including in combination means for recording a portion of said first area contiguous to said second area during flight over said first area, means for displaying said second area during flight thereover, means for displaying said recorded portion adjacent said second area display to indicate a transverse deviation of the line of flight over said second area from said desired line, and means adapted to be actuated to bring said recorded display into registry with said second area display.

5. A transverse correlation system for facilitating flight on successive legs along desired parallel lines over a plurality of areas adjacent to each other in a direction transverse to the lines of flight including in combination means for recording a portion of a particular area contiguous to an area corresponding to the next successive flight leg during the preceding flight leg, means for producing a representation of said area corresponding to the next successive flight leg during said next successive flight leg, means for comparing said recorded portion with said representation during said next successive flight leg to produce an indication of a transverse deviation of the line of flight during said next successive leg from the desired line and means for recording a portion of the area corresponding to the next successive leg contiguous to the area corresponding to the flight leg following said next successive leg.

6. A transverse correlation system for facilitating flight on successive legs along desired parallel lines over a plurality of areas adjacent to each other in a direction transverse to the lines of flight including in combination means for recording a portion of each particular area contiguous to the area corresponding to the next flight leg during the preceding flight leg over the particular area, means for producing a representation of the area being covered on each flight leg, and means operable during each flight leg for displaying each recorded portion alongside the next flight leg representation during the next flight leg to indicate the transverse deviation of said next flight leg from that required to provide a continuous representation of areas corresponding to successive flight legs.

7. A transverse correlation system for enabling travel along a desired line over a second area, said line being parallel to a line previously traveled over a first area adjacent said second are in a direction transverse to said desired line of travel including in combination means for recording a portion of said first area contiguous to said second area during travel over said first area, means for producing a representation of said second area during travel thereover and means for comparing said representation with said recorded portion to produce an indication of a transverse deviaton of the line of travel over said second area from said desired line.

References Cited by the Examiner
UNITED STATES PATENTS

| | | | |
|---|---|---|---|
| 3,054,999 | 9/1962 | Forbath | 178—6 |
| 3,103,008 | 9/1963 | Mooney | 343—5 |

DAVID G. REDINBAUGH, *Primary Examiner.*

H. W. BRITTON, *Assistant Examiner.*